US008725721B2

(12) United States Patent
Macklem et al.

(10) Patent No.: US 8,725,721 B2
(45) Date of Patent: May 13, 2014

(54) PERSONALIZING SCOPING AND ORDERING OF OBJECT TYPES FOR SEARCH

(75) Inventors: Walter Macklem, San Francisco, CA (US); David Nathanson, San Francisco, CA (US); Jia Chen, Foster City, CA (US); Luke Ball, Berkeley, CA (US); Shankara B. Subramanya, Sunnyvale, CA (US); Kanishka Maheshwari, San Francisco, CA (US); Susan Kimberlin, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 40 days.

(21) Appl. No.: 13/465,851

(22) Filed: May 7, 2012

(65) Prior Publication Data

US 2013/0054583 A1 Feb. 28, 2013

Related U.S. Application Data

(60) Provisional application No. 61/527,509, filed on Aug. 25, 2011.

(51) Int. Cl.
*G06F 17/30* (2006.01)

(52) U.S. Cl.
USPC .......................................... 707/721; 707/732

(58) Field of Classification Search
None
See application file for complete search history.

(56) References Cited

U.S. PATENT DOCUMENTS

| 6,148,294 | A  | * | 11/2000 | Beyda et al. ........................... 1/1 |
| 6,202,058 | B1 | * | 3/2001 | Rose et al. ...................... 706/45 |
| 2004/0193639 | A1 | * | 9/2004 | Bergman et al. .......... 707/103 R |
| 2008/0005685 | A1 | * | 1/2008 | Drews et al. .................. 715/764 |
| 2011/0264681 | A1 | * | 10/2011 | Kimberlin et al. ............. 707/767 |
| 2012/0259849 | A1 | * | 10/2012 | Deodhar et al. .............. 707/737 |

OTHER PUBLICATIONS

"Stuff I've Seen: A System for Personal Information Retrieval and Re-Use," by Dumais et al. In: SIGIR'03 (2003). Available at: ACM.*

* cited by examiner

*Primary Examiner* — Daniel Kinsaul
(74) *Attorney, Agent, or Firm* — Haynes Beffel & Wolfeld LLP; Ernest J. Beffel, Jr.

(57) ABSTRACT

A method of establishing personalized limits on a search responsive to a key word query in an enterprise search system is described that includes receiving an object types access history for a particular user. Applying this method, the object types access history includes records of object types selected from search results returning multiple object types and records of object types selected via interfaces other than search results. The method continues with determining and storing in computer readable memory a personalized scope of object types. The personalized scope of object types sets a limit on object types initially returned by an enterprise search system for the particular user in response to key word queries by the particular user that do not specify object types to search.

21 Claims, 7 Drawing Sheets

PERSONALIZING SCOPING AND ORDERING OF OBJECT TYPES FOR SEARCH

RELATED APPLICATION

This application claims the benefit of U.S. Provisional Patent Application No. 61/527,509, entitled, "System for Personalized Scoping and Ordering of Entities for Search," filed on 25 Aug. 2011. The provisional application is hereby incorporated by reference for all purposes.

BACKGROUND

The technology disclosed relates to establishing limits on object types initially returned in response a key word search in an enterprise search system that includes multiple object types. In particular, it establishes object type scope limits for either new or experienced users and applies the scope limits to searches that do not specify the object types to return.

Enterprise search systems often return results in response to key word queries that include multiple object types in the results. Current systems search all available object types to produce multiple results that match the key word query, unless the user specifies object types to search. This degrades search performance, returns irrelevant results and requires extra resources. Furthermore, search systems may return multiple object types in an order that has an arbitrary relationship to user interest, such as alphabetical by object type name.

An opportunity arises to improve search result presentation according to user preferences and user interest. An opportunity also arises to reduce the cost of searching object types of interest. More relevant results may be presented before less relevant results at less cost.

SUMMARY

In one implementation, a method of establishing personalized limits on a search responsive to a key word query in an enterprise search system is described that includes receiving an object types access history for a particular user. Applying this method, the object types access history includes records of object types selected from search results returning multiple object types and records of object types selected via interfaces other than search results. The method continues with determining and storing in computer readable memory a personalized scope of object types. The personalized scope of object types sets a limit on object types initially returned by an enterprise search system for the particular user in response to key word queries by the particular user that do not specify object types to search.

Particular aspects of one or more implementations of the subject matter described in this specification are set forth in the drawings and the description below. Other features, aspects, and advantages of the subject matter will become apparent from the description, the drawings, and the claims.

DETAILED DESCRIPTION

The following detailed description is made with reference to the figures. Preferred implementations are described to illustrate the present technology, not to limit its scope, which is defined by the claims. Those of ordinary skill in the art will recognize a variety of equivalent variations on the description that follows.

Technology is described herein for establishing personalized object type scope limits on a key word query in an enterprise search system that includes multiple data object types, where the search does not specify the object types to return. Both a personalized scope of object types and personalized ordering of object types returned are described. The technology is described within an environment (FIG. 1) that includes a personalization engine, a user computing device that includes a search interface and a non-search interface, a multi-tenant database for an organization, log files, aggregation files, scope files, and a communication network that provides communication between various components of the environment.

In one implementation, the personalization engine (FIG. 2) includes a user click logging module, a user count calculating module, a user record aggregating module and a scope determining module. Some implementations may have different and/or additional modules.

The scope and ordering determining module determines the scope of object types and the ordering of object types for the particular user using the information in the object types access history. The scope of object type components decides which object types to return in response to a search query for the particular user, when the search query does not specify the object types to return. The ordering of object type components decides the order in which search results are presented. The scope of object types and the ordering of object types for the particular user are stored in scope files.

A new user does not have an object types access history from which to create a personalized scope of object types and a personalized ordering of object types. In some implementations, an initializing method uses a relationship-interest graph to identify similar users. The relationship-interest graph represents relationships among users in the organization and interests of the users. The initializing method initializes the personalized scope of object types and the personalized ordering of object types for the new user using the personalized scopes of object types and the personalized ordering of object types of the similar users.

Figure 1:
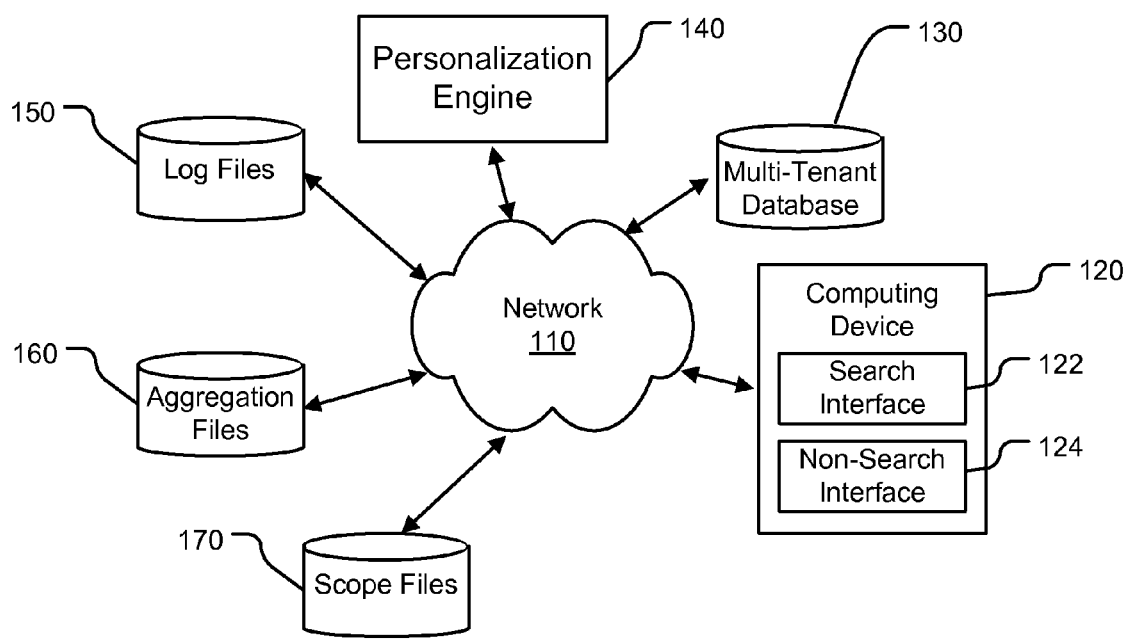
FIG. 1 illustrates a block diagram of an example environment in which personalization of scopes and ordering of object types can be used.

FIG. 1 illustrates a block diagram of an example environment 100 in which personalization of scopes and ordering of object types can be used, according to one implementation. The environment 100 includes a user computing device 120 and a personalization engine 140. The user computing device 120 has a search interface 122 and a non-search interface 124. The environment 100 may include multiple user computing devices 120. The environment 100 also includes a communication network 110 that allows for communication between various components of the environment 100.

During operation, users interact with their computing devices 120, such as smartphones, tablets, laptops or desktop computers to enter search queries, receive search results via the search interface 122 or to access information other than search results via the non-search interface 124. The user computing device 120 and the personalization engine 140 each include memory for storage of data and software applications, a processor for accessing data and executing applications, and components that facilitate communication over the communication network 110. The personalization engine 140 defines the personalized scope of object types to return, at least initially, in response to searching in a multi-tenant database 130. A user optionally can request a further search or specify a search of all available object types, to override the personalized scope of objection types.

The personalization engine 140 writes and reads log files 150, aggregation files 160 and scope files 170. The log files 150 may correspond to one log file per user, one log file for multiple users, or multiple log files for one user. The aggregation files 160 may correspond to one aggregation file per user, one aggregation file for multiple users, or multiple aggregation files for one user. The scope files 170 may correspond to one scope file per user, one scope file for multiple users, or separate scope and ordering files for one user.

Figure 2:
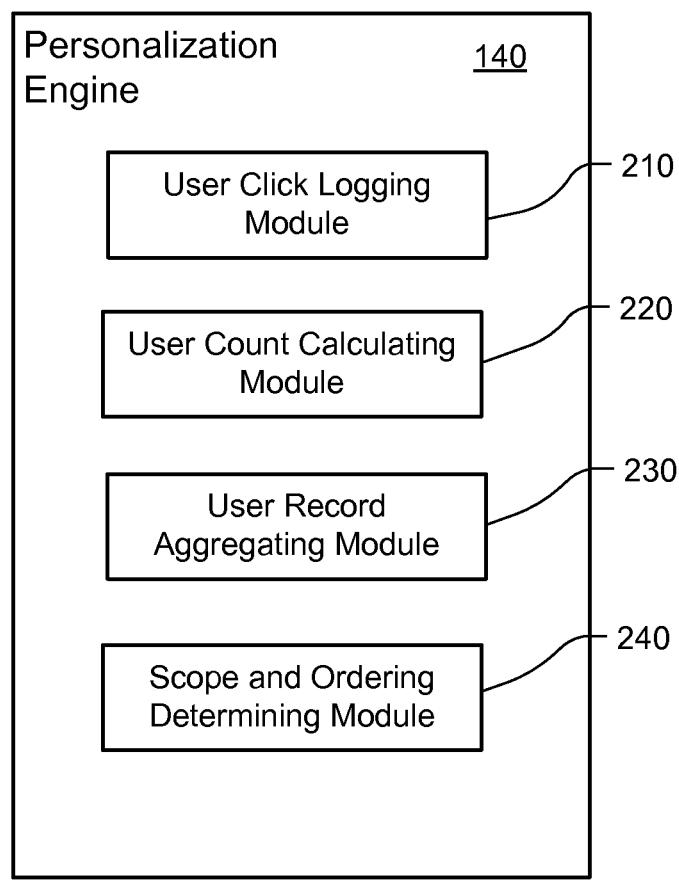
FIG. 2 illustrates a block diagram of example modules within the personalization engine.

FIG. 2 is a block diagram illustrating example modules within the personalization engine 140, according to one implementation. Some implementations may have different and/or additional modules than those shown in FIG. 2. Moreover, the functionalities can be distributed among the modules in a different manner than described herein.

The user click logging module 210 logs user clicks made via the search interface 122 within the example environment 100. The user clicks may be made on search results returned in response to a key word query in the multi-tenant database 130. The user clicks may also be made on objects other than search results. When a user clicks on a search result, the click is logged as a search result click. In some implementations, only the object type selected as a result of the user click is logged. When a user clicks on an object other than a search result, the click is logged as a non-search result click, in some instances logging only the object type selected. The user click logging module 210 saves records of clicks in the log files 150. A record for a user click includes at least the object type selected from search results. It may further include identification of the user, identification of the organization associated with the user and/or identification of the click type. The record may also include the query. For object types accessed by the user via the non-search interface 124, the record includes at least the object type and may include a URL (uniform resource locator) for a reference to an Internet or other network resource that is associated with the user click, a timestamp and/or identification of the click type. The records in log files 150 may be organized by object types, by user, by organization associated with the user, or by time of processing.

In one implementation, a separate log file records user clicks by one user. In alternative implementations, records of user clicks by more than one user may be kept in one log file. Furthermore, different types of records for one user may be kept in different log files. For example, records of search result clicks are kept in one log file for a user while records of non-search result clicks for the same user are kept in a different log file. Thus the log files 150 may correspond to one log file per user, one log file for multiple users, or multiple log files for one user.

The user count calculating module 220 calculates counts of search result clicks and counts of non-search result clicks from the records of user clicks in the log files 150. Both counts of search result clicks and counts of non-search result clicks are calculated on an occasional or a periodic basis such as a daily, a weekly or other basis. Both counts of search result clicks and counts of non-search result clicks are calculated for each object type and for each user.

The user record aggregating module 230 updates aggregation files 160 with both counts of search result clicks and counts of non-search result clicks that are calculated on an occasional or periodic basis. The aggregation files 160 accumulate the history of both types of counts for an aggregation period longer than the period for which counts are calculated. The aggregation files 160 accumulate the history for an aggregation period. The aggregation period may be fixed or tunable. A circular buffer may be used for updating aggregation files 160. For example, if the aggregation period is 90 workdays, then counts of user clicks from the first (earliest) workday are removed or overwritten and counts of user clicks from the ninety-first workday (latest) replace them. Aggregation periods of 15-120 workdays, or 30-90 workdays or about 30, 45, 60, 75 or 90 workdays may be used. A workday may be any day in a calendar week when any user uses or is expected to use the enterprise search system.

In one implementation, a separate aggregation file keeps counts of user clicks by one user. In alternative implementations, counts of user clicks by more than one user may be kept in one aggregation file. Furthermore, different types of counts for one user may be kept in different aggregation files. For example, counts of search result clicks are kept in one aggregation file for a user while counts of non-search result clicks for the same user are kept in a different aggregation file. Thus the aggregation files 160 may correspond to one aggregation file per user, one aggregation file for multiple users, or multiple aggregation files for one user.

In an alternative implementation, records of object types in the log files 150 and records of object types in the aggregation files 160 may be merged into one new file. In that case, the user click logging module 210, the user count calculating module 220, and the user record aggregating module 230 may access the same new file.

The scope and ordering determining module 240 determines the scope of object types and the ordering of object types for a particular user using the information in the aggregation files 160. The scope of object types decides which object types to search given a search query for the particular user. The ordering of object types decides the order in which search results from the search query are presented.

In general, the scope and ordering determining module 240 saves the scope of object types and the ordering of object types for a particular user in scope files 170. In one implementation, a separate scope file keeps the scope of object types and the ordering of object types for one user. In alternative implementations, the scope and the ordering information for more than one user may be kept in one scope file. Furthermore, the scope information for one user may be kept in one scope file while the ordering information for the same user may be kept in a separate ordering file. Thus the scope files 170 may correspond to one scope file per user, one scope file for multiple users, or separate scope and ordering files for one user.

Figure 3:
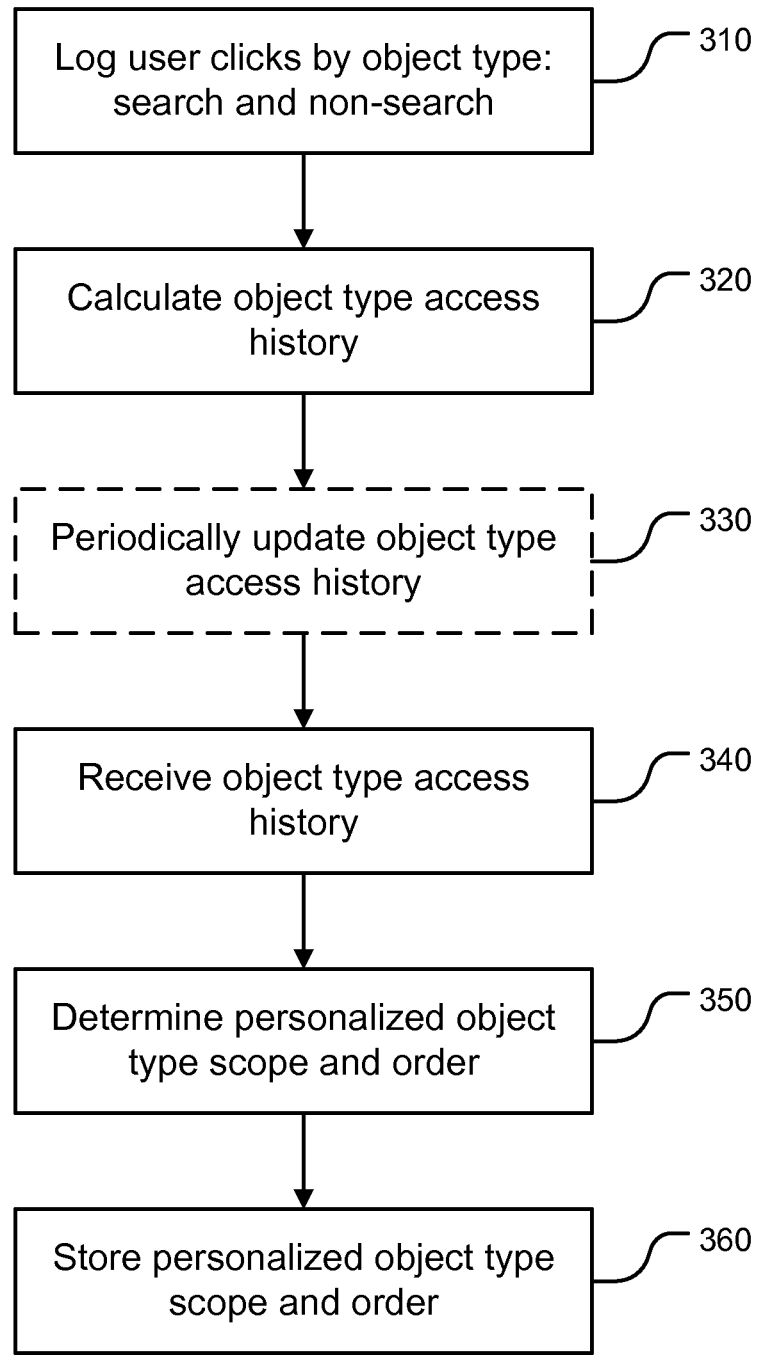
FIG. 3 is a high-level flow chart of one implementation of personalizing scopes and ordering of object types of an established user.

FIG. 3 is a high-level flow chart of one implementation of personalizing the scope of object types and/or the ordering of object types for a user. For convenience, the actions 310-360 identified in this flow chart are described with respect to a system that performs the actions. The actions identified can be combined in a variety of ways and expressed in a variety of methods. For instance, logging does not need to be part of determining a personalized scope of object types to return. Determining the scope and order of object types to return can be separate methods. With Step 310, the system logs user clicks, including selection among objects types returned in response to a key word query via the search interface 122 and/or on objects accessed by the user via the non-search interface 124. Records of the user clicks are saved in log files 150. As described above, the log files 150 may correspond to one log file per user, one log file for multiple users, or multiple log files for one user.

A record for a user click includes the object type selected or accessed, and may optionally include the identification of the user, the identification of the organization associated with the user, the signal type for a user click on search results or on objects other than search results, a URL (uniform resource locator) for a reference to an Internet or other network resource that is associated with the user click, and a timestamp. The record may also include one or more key words in a key word query. The records in log files 150 may be organized by object types, by user, by organization associated with the user, by time of processing or by other criteria.

The system calculates counts 320 from the object types access history, including counts from search result clicks and counts from non-search result clicks, using the records of user clicks in the log files 150. Counts of search result clicks and counts of non-search result clicks are calculated on a periodic basis such as a daily basis, at least a weekly basis or a monthly basis. These counts are calculated by object type and user.

A threshold on the count of user clicks is pre-defined for each object type, reducing noise and increasing stability of the resultant personalized scope of object types and the personalized ordering of object types for the particular user. An object type for which the count of user clicks for the particular user is below the pre-defined threshold may be excluded from the resultant personalized scope of object types and the personalized ordering of object types for the particular user.

To incorporate changing user preferences over time, a weighting function can be used that weights newer user clicks on object types by the particular user with larger weights than older user clicks by the particular user. A first weighting function is used for object types selected among the object types returned in the search results. A second weighting function is used for object types available via interfaces other than search results. The first weighting function and the second weighting function may adjust the personalized ordering of object types for the particular user.

Optionally, the system updates an object types access history 330 with both counts of search result clicks and counts of non-search result clicks on the same periodic basis as for calculating the counts. The object types access history includes records of object types selected from search results returning multiple object types via the search interface 122 and records of object types other than search results accessed by the particular user via the non-search interface 124. Counts from the object types access history are saved in aggregation files 160. As described above, the aggregation files 160 may correspond to one aggregation file per user, one aggregation file for multiple users, or multiple aggregation files for one user.

The system receives object types access history 340, either from log files or aggregated counts, and determines a personalized object types scope for a particular user 350. It optionally includes determining a personalized object type ordering. The object types access history includes records of object types selected from search results returning multiple object types via the search interface 122 and records of object types accessed by the particular user via the non-search interface 124. These records are used to determine the scope and/or ordering of object types returned. The personalized scope of object types sets a limit on initial searching performed by an enterprise search system for the particular user in response to key word queries by the particular user. The personalized ordering of object types sets an order in which to present search results.

There are many ways in which scores can be calculated for determining the personalized scope and ordering of object types for a user that has their own object types access history. For instance, a simple count of object type selections within a predetermined time period could be used. Weighted counts could be calculated, with the same or different weights applied to selection among search results and to selection among object types via different interface that does not present search results. Time weighted counts could be used, either applying predetermined weights to a circular buffer of periodic counts, or using a form of moving average, such as a simple moving average, cumulative moving average, weighted moving average or exponential moving average.

Other implementations may differentiate between and separately code a wider variety of user actions. For instance, selections of object types not initially visible on the screen (sometimes called below the fold) may be considered different signals than selections of object types that were initially visible (above the fold.) Call these signals S1 and S2, for instance. Similarly, object types selected from a work queue or work flow may be considered different signals than object types selected by browsing a more general population. Say, signals S3 and S4. The different signals, such as S1-S4, can be combined by summing weighted signal counts using any of the counting approaches identified. If the corresponding weights are C1-C4, the signal weight for a first object type O1 may be calculated as:

$$O1=C1*S1+C2*S2+C3*S3+C4*S4, \text{ and so on.}$$

The weights may be tunable constants. In some implementations, signals may be divided into tiers, with the first tier being the primary determinant and second or subsequent tiers used as tie breakers. For instance:

$$\text{Tier 1 score}=C1*S1+C2*S2+C3*S3$$

$$\text{Tier 2 score}=C4*S4$$

Among the access to object types that might be separately weighted are the most recently selected object types, the most frequently selected object types, interest in records created by the particular user, and records assigned for action by the particular user.

Automatically assigned object types may optionally be combined with one or more object types that the particular user configures to be within the user's personalized scope of object types.

From a corporate social network, the personalized scope of object types may further take into accounts object types within the personalized scopes of similar users, object types that the particular user follows, and object types to which the particular user has posted. Similar users are further discussed below, in connection with FIGS. 5 and 6.

In some implementations, the results of an initial search within the personalized scope of object types can automatically trigger an expanded search. For instance, when a search within the personalized scope of a particular user does not find any results, the search can be automatically expanded to additional object types or all object types available in the multi-tenant database. Or, the user interface can indicate that no results were found and invite the user to select an expanded search scope that includes either additional object types or all object types available.

With Step 360, the system stores the personalized scope of object types and the personalized ordering of object types in scope files 170. As described above, the scope files 170 may correspond to one scope file per user, one scope file for multiple users, or separate scope and ordering files for one user. The scope files 170 may reside in the multi-tenant database 130, in the memory of the user computing device 120 or another convenient location.

Figure 4A:
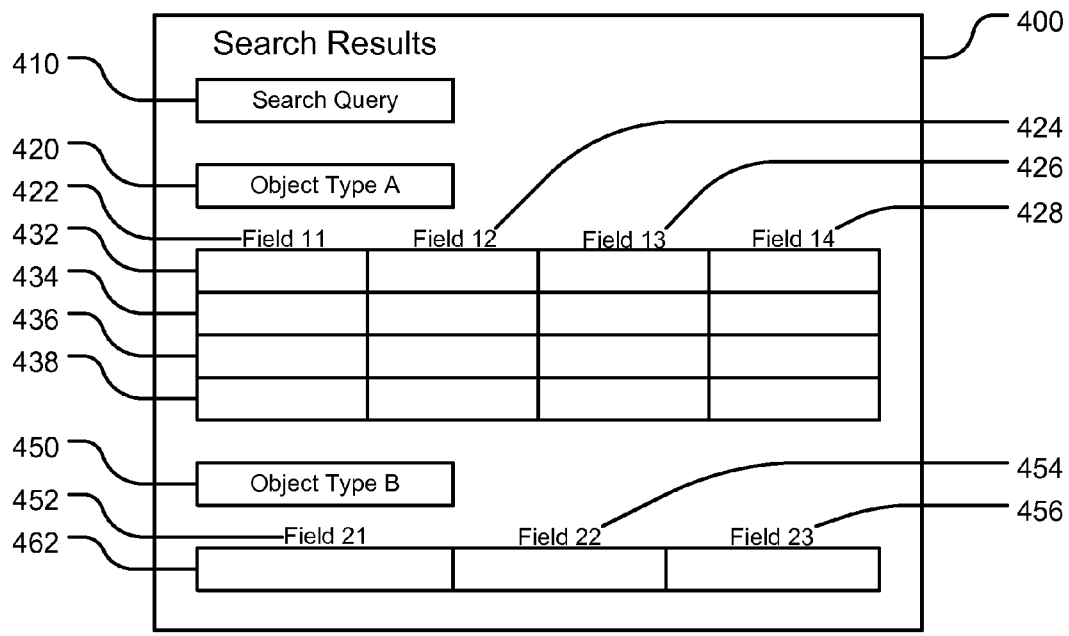
FIG. 4A is an example graphic user interface for searching.

FIG. 4A is an example graphic user interface for submitting a search query and viewing search results. In this example, a search page view 400 is a web page displayed to a user in a browser executing on user computing device 120. The user enters search query 410. Search results are grouped by object type. Typically, the search results contain more than one object type. For each object type, there may be multiple records. Each record contains one or more fields. In this example, object type A 420 is an object type returned from search results. Records 432 through 438 are records of the object type. Although only four records are shown in this example, more records may be returned for each object type. In this example, four fields 422 through 428 are shown for each record. However, more fields may exist in each record. Object type B 450 is another object type returned from search results. Record 462 is returned with three fields 452 through 456 for the object type. Although record 462 is the only record returned in this example, more records may be returned for each object type in general. The order of listing the object types can be determined by applying the personalized ordering technology disclosed herein.

Figure 4B:
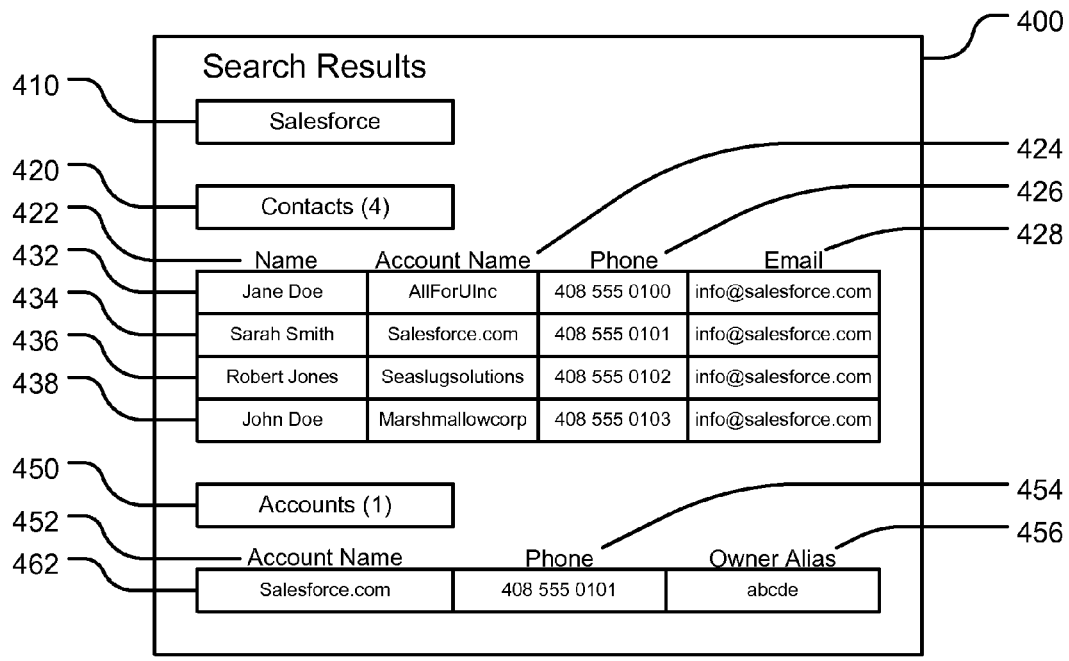
FIG. 4B is an example graphic user interface with searching results.

FIG. 4B is the same example graphic user interface as FIG. 4A, with sample search results. Key word "Salesforce" is entered for the search query 410. Two object types are returned from search results. Object type "Contacts" is returned for object type A 420. Number four (4) after "Contacts" indicates the number of records returned for the object type. Each record contains four fields. The four fields 422 through 428 are labeled in the example Name, Account Name, Phone, and Email respectively. For the first record 432, the sample values in the four fields 422 through 428 are "Jane Doe", "AllForUInc", 408-555-0100, and "info@salesforce.com", respectively. Object type "Accounts" is returned for object type B 450. Number one (1) after "Accounts" indicates the number of records returned for the object type. Each record contains three fields. The three fields 452 through 456 are labeled in the example Account Name, Phone, and Owner Alias respectively. For the first record 462, the sample values in the three fields 452 through 456 are "Salesforce.com", 408-555-0101, and "abcde", respectively.

In addition to determining personalized scopes and ordering of object types for established users, the technology described can be used to determine a personalized scope and ordering of object types for a new user. A new user is one who has too little object types access history to effectively create a personalized scope of object types and a personalized ordering of object types based on the user's experience. A user can be considered a new user based on the volume of object types access history available, the number of days or workdays since they enrolled in the system or since they completed training, a supervisor's determination or a user's self selection of whether the system should treat them as a new user.

Some implementations of establishing a personalized scope and ordering of object types for a new user include identifying similar users to the new user based on a relationship-interest graph. The relationship-interest graph represents the relationships between users in the organization and also the interests that users have in multiple types of records or particular records. Types of records may, for example, be accounts, business deals, work items, contacts, opportunities, leads etc.

Figure 5:
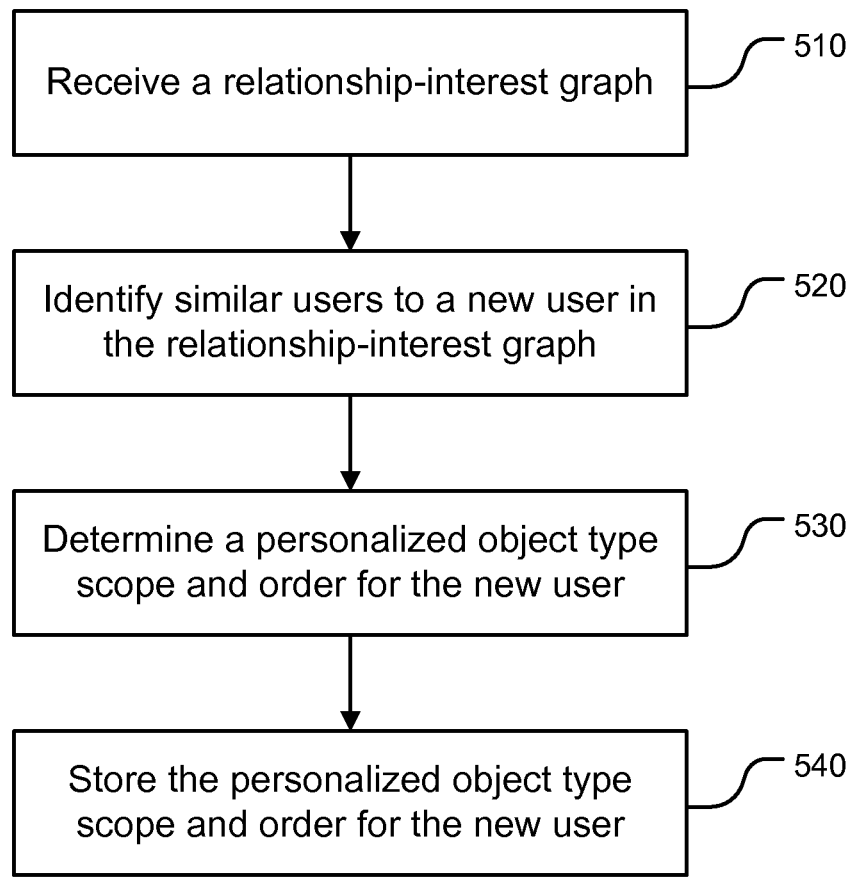
FIG. 5 is a high-level flow chart of one implementation of initializing a scope of object types and an ordering of object types for a new user.

FIG. 5 is a high-level flow chart of one implementation for initializing the scope of object types and the ordering of object types for the new user. For convenience, the actions 510-540 in the flow chart will be described with respect to a system that carries out these actions. The system receives a relationship-interest graph for at least one organization 510. In one implementation, the relationship-interest graph represents users and records as nodes, relationships between users as unidirectional or bidirectional links, and interest from users to records as unidirectional links. A link connects two nodes. A node may be connected to multiple links.

The system identifies similar users to the new user in the relationship-interest graph 520. Some implementations of identifying similar users are illustrated in FIG. 6.

A relationship in the relationship-interest graph is established by the action of one user following another user. In the profile page of a user on a corporate social network, there may be a follow button. A user on the corporate social network may select another user on the network. Once the user has selected the other user, the user may click the follow button in his profile page to follow the other user and thereby establish a relationship to the other user. The relationship is unidirectional when one user follows the other user but not vice versa. The relationship is bidirectional when each user follows the other. An interest in the relationship-interest graph is established by the action of one user following a record. In a record page in the enterprise search system, there may be a follow button. When viewing the record, a user may click the follow button and thereby establish an interest to the record. Typically, a user may follow a record only if he has been authorized to access it. An interest is unidirectional from the user to the record. One or more users may have an interest in the same records.

By traversing the relationship-interest graph, the system can identify similar users as users who have a relationship with the new user, as users who are part of a clique with the new user, as users who share an interest in a certain number of records with the new user, and as users who share a relationship with a certain number of other users with the given user. In the relationship-interest graph, a clique is a group of users who are linked to each other. Optionally, a maximum number of users may be set for the number of users in a clique, to avoid interpreting company or division roster as a clique. In a rare case where a clique includes all users in a corporation, the system ignores the clique for finding similar users instead of applying the maximum number of users.

Figure 6:
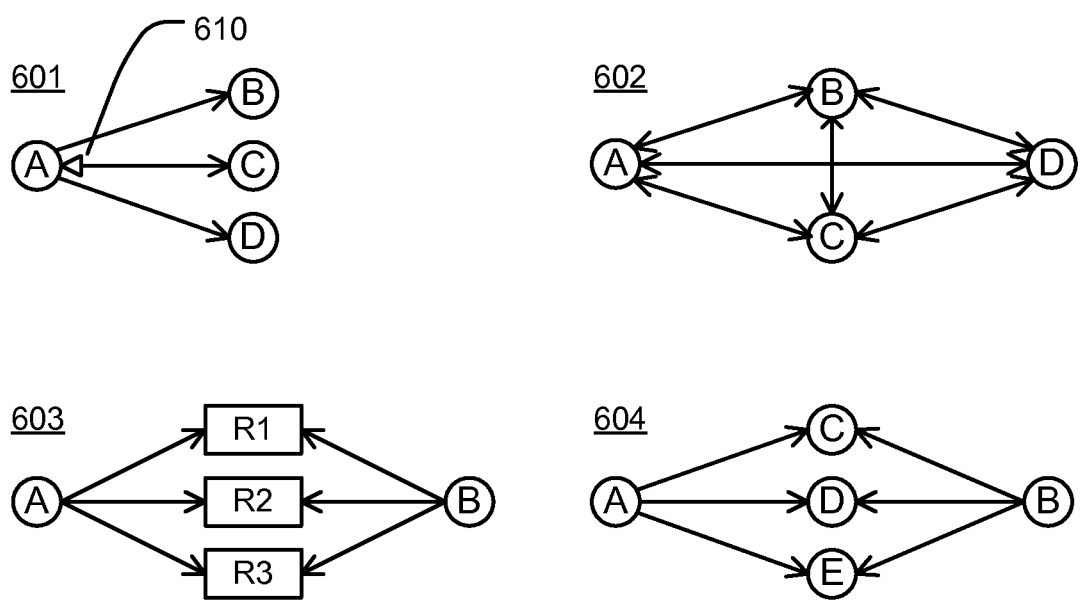
FIG. 6 illustrates four example graphs for identifying similar users to a new user.

FIG. 6 illustrates how similar users may be identified via four example relationship-interest graphs 601, 602, 603 and 604. In the graphs, node A represents the new user. Nodes B through E represent other users. Nodes R1, R2 and R3 represent different records such as accounts, opportunities, work items etc. A relationship from one user to another user is represented by a relationship link. A relationship link may be unidirectional or bidirectional as two users may follow each other. An interest a user has in a record is represented by an interest link. An interest link is unidirectional from the user to the record.

Graph 601 in FIG. 6 illustrates a selection of similar users on the basis of direct relationships with the new user. In graph 601, a new user A follows users B, C and D and thus has direct relationship links with them. Therefore other users B, C and D may be considered as similar users to the new user A. The direct relationship links between the new user A and the users B and D are unidirectional from the new user A to users B and D. The direct relationship link between the new user A and the user C is bidirectional, indicated by a hollow arrow 610, which corresponds to user C following the new user A.

Graph 602 in FIG. 6 illustrates a selection of similar users on the basis of being part of a clique with the new user. In graph 602, a new user A is in a clique with other users B, C, and D where all four have bidirectional relationship links to each other. Applying the clique, other users B, C and D are similar users to the new user A. The relationship between users in a clique is a relatively strong relationship.

Graph 603 in FIG. 6 illustrates a selection of similar users on the basis of shared interest in a certain number of records that are also linked to the new user. In graph 603, a new user A and another user B both have interest links to records R1, R2 and R3. They share an interest in the same three records and therefore user B is a similar user to the new user A. A threshold number of common records in which the new user A and the other user B share an interest can be applied to qualify the user B as a similar user to the new user A. The threshold number of common records may be derived empirically. In one example, the threshold number of common records may be a 3, 5 or 10. In another example, the threshold number is tunable within a range according to factors such as types of the records. Alternatively, the threshold number can be a percentage or factor of the number of records to which new user A has an interest link. The threshold number of common records is tuned with the goal of obtaining an optimal number of similar users. If the threshold number of common records is too low, then the number of similar users and consequently the scope for the new user may be too large. If the threshold number of common records is too high, then the number of similar users and consequently the scope for the new user may be too small. An optimal threshold of common records means that the resultant scope for the new user is close to the median of the scope sizes of existing users in the enterprise search system.

Graph 604 in FIG. 6 illustrates selection of similar users are users who share a relationship with a certain number of other users with the given user. In graph 604, a new user A and a user B both have relationship links to other users C, D and E. Applying the common relationship criteria, new user A and user B share a common relationship with the same three users C, D and E and therefore user B is a similar user to the new user A. A threshold number of common users with whom the new user A and the user B share a relationship may be applied to qualify the user B as a similar user to the new user A. The threshold number of common users may be derived empirically. In one example, the threshold number of common users may be a constant such as 3, 5 or 10. In another example, the threshold number is tunable within a range. Alternatively, the threshold number can be a percentage or factor of the number of records to which new user A has a relationship link. The threshold number of common users is tuned with the goal of obtaining an optimal number of similar users. If the threshold number of common users is too low, then the number of similar users and consequently the scope of the new user may be too large. If the threshold number of common users is too high, then the number of similar users and consequently the scope of the new user may be too small. An optimal threshold of common users means that the scope for the new user is close to the median of the scope sizes of existing users in the enterprise search system.

Once the similar users to the new user are identified using one or more of the criteria illustrated in FIG. 6 or other similarity criteria, the system determines the personalized scope of object types and the personalized ordering of object types for the new user 530 using the personalized scopes of object types and the personalized ordering of object types of the similar users. The system receives scores or ranks for object types in the personalized scopes of object types of the similar users in the relationship-interest graph. Scores may be calculated using the linear combination described for Step 350 in FIG. 3 or another scoring scheme. Ranks may rank the order of object types based on scores or other criteria.

In one implementation, each object type is scored and/or ranked for each of the similar users, including object types not within the personalized scopes of object types of the similar users. Alternatively, an arbitrary score such as zero or rank such as last can be applied to object types not within the personalized scopes. Scores or ranks for the object types are combined to produce aggregate scores for the object types across the similar users. For example, three similar users A, B and C are identified in the relationship-interest graph. If the precalculated score of object type O1 is 300 for similar user A, 400 for similar user B, and 500 for similar user C, then the aggregate score for object type O1 is 300+400+500=1200. Alternatively, ranks in the similar user lists could be aggregated, such as 3+2+1=6.

The system can sort the object types in order of their aggregate scores to produce a sorted list of object types. For example, if object type O1 has a summed score of 1200, object type O2 has a summed score of 500, and object type O3 has a summed score of 2500, then the sorted list orders the three object types as O3, O1, and O2 corresponding to the numerical values of 2500, 1200, and 500. Or, with ranks, the aggregate rank scores might be 4, 6, and 12. Aggregate scores can be averaged or normalized.

Optionally, a scoring threshold is applied to discard object types whose summed scores are at or below the scoring threshold and to include object types whose summed scores are above the scoring threshold in the personalized scope of object types for the new user. Alternatively, a ranking threshold may be used to discard object types whose rank in the sorted list of object types are at or below the ranking threshold and to include object types whose rank in the sorted list of object types are above the ranking threshold in the personalized scope of object types for the new user. The scoring threshold or the ranking threshold may vary with different object types. The scoring threshold or the ranking threshold may be constant or tunable. If a threshold is applied, it may be unnecessary to sort object types in order to determine the personalized scope of object types. The scoring and the ranking thresholds and the number of similar users may be tuned empirically in conjunction. After sorting, the sorted list of object types may include a large number of similar users. The system then applies the scoring threshold and the ranking threshold to limit the scope.

Applying a sorting approach, the personalized ordering of object types for the new user can be taken from the same list used to determine the personalized scope of object types. The sorted list can be used for both personalization tasks.

The system stores the personalized scope of object types and the personalized ordering of object types 530 for use and reuse.

Figure 7:
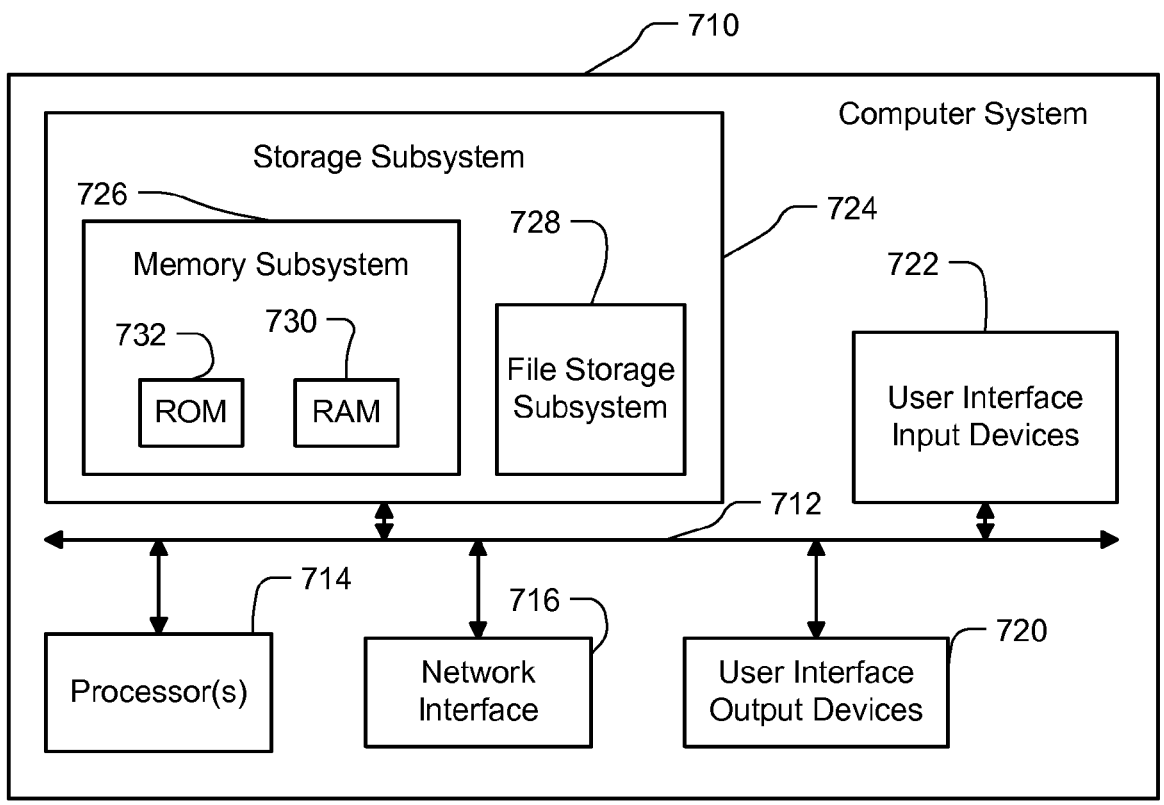
FIG. 7 is a block diagram of an example computer system.

FIG. 7 is a block diagram of an example computer system, according to one implementation. Computer system 710 typically includes at least one processor 714 which communicates with a number of peripheral devices via bus subsystem 712. These peripheral devices may include a storage subsystem 724 including, for example, memory devices and a file storage subsystem, user interface input devices 722, user interface output devices 720, and a network interface subsystem 716. The input and output devices allow user interaction with computer system 710. Network interface subsystem 716 provides an interface to outside networks, including an interface to communication network 110, and is coupled via communication network 110 to corresponding interface devices in other computer systems.

User interface input devices 722 may include a keyboard; pointing devices such as a mouse, trackball, touchpad, or graphics tablet; a scanner; a touchscreen incorporated into the display; audio input devices such as voice recognition systems and microphones; and other types of input devices. In general, use of the term "input device" is intended to include all possible types of devices and ways to input information into computer system 710 or onto communication network 110.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. These software modules are generally executed by processor 714 alone or in combination with other processors.

Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 728 in the storage subsystem 724, or in other machines accessible by the processor.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a one example. Many other configurations of computer system 710 are possible having more or fewer components than the computer system depicted in FIG. 7.

Particular Implementations

One implementation of the technology disclosed is a method of establishing personalized limits on a search responsive to a key word query to an enterprise search system is described. The method includes receiving an object types access history for a particular user. Applying this method, the object types access history includes records of object types selected from search results returning multiple object types and records of object types selected via interfaces other than search results. The method also includes determining and storing in computer readable memory a personalized scope of object types. The personalized scope of object types sets a limit on object types initially returned by an enterprise search system for the particular user in response to key word queries by the particular user that do not specify object types to search. Additional implementations of the technology disclosed include corresponding systems, apparatus, and computer program products.

These and additional implementations can include one or more of the following features. In some implementations, the method further includes determining and storing in computer readable memory a personalized ordering of object types for the particular user using the object types access history. The personalized ordering of object types sets an order in which to present search results from the search performed by the enterprise search system.

A further implementation may include creating the object types access history by logging to computer readable memory at least a summary of user clicks by the particular user that select among the object types returned in the search results and/or available via interfaces other than search results, and by calculating counts of the user clicks among search results and of the user clicks via interfaces other than search results. This implementation may further include periodically updating the object types access history with the counts. The periodically updating may be performed on at least a weekly basis.

Another implementation determines the personalized scope of object types by applying a first weighting function to user clicks that select among the object types returned in the search results, wherein the first weighting function weights newer user clicks more heavily than older clicks, and by applying a second weighting function to user clicks that select among the object types available via interfaces other than search results, wherein the second weighting function weights newer user clicks more heavily than older clicks.

Implementations may determine the personalized scope of object types by applying at least a first threshold on number of user clicks on an object type to limit the personalized scope of object types.

Another method initializes personalized limits for a new user on a key word based search responsive to a key word query in an enterprise search system. The method includes receiving a relationship-interest graph for users in an enterprise search system, identifying similar users to a new user in the relationship-interest graph, and determining and storing in computer readable memory a personalized scope of object types for the new user using previously established personalized scopes of object types of the similar users.

In some implementations, the relationship-interest graph represents relationships between the new user and other users as relationship links connecting the new and other users, and represents interests shared by the new user and the other users as interest links connecting the new and other users to records. The personalized scopes of object types for the users set limits on initial results returned by an enterprise search system in response to key word queries that do not specify object types to search.

Implementations may further include determining and storing in computer readable memory a personalized ordering of object types for the new user using the personalized orderings of object types of the similar users. The personalized ordering of object types sets an order in which to present search results from the search performed by the enterprise search system.

Some implementations further identify similar users by identifying users who are connected to at least a minimum number of records to which the new user is also connected via the interest links in the relationship-interest graph. The method also may identify similar users by identifying other users who are connected to at least a minimum number of users to whom the new user is also connected via the relationship links in the relationship-interest graph.

Some implementations further determine a personalized scope of object types for the new user by ranking object types for at least the similar users in response to key word queries that do not specify object types to search, including object types not in the personalized scopes of object types for the similar users, and by combining the object type ranks for the object types of the similar users in the relationship-interest graph to produce an aggregate rank for each object type and using the aggregate rank to determine the personalized scope of object types for new user.

The method may further include re-ranking object types for the similar users in the relationship-interest graph, and including object types whose summed ranks are above a minimum threshold in the personalized scope of object types and the personalized ordering of object types for the new user.

As mentioned above, the technology disclosed may be implemented in a computer system for establishing personalized limits on a search responsive to a key word query to an enterprise search system. The computer system includes one or more processors configured to perform operations implementing methods as described herein and any of the features and optional implementations of the methods described.

As mentioned above, the technology disclosed may be implemented in non-transitory computer readable medium storing computer instructions to establish personalized limits on a search responsive to a key word query to an enterprise search system. The non-transitory computer readable medium includes actions to implement methods as described herein and any of the features and optional implementations of the methods described.

While the present technology is disclosed by reference to the preferred implementations and examples detailed above, it is understood that these examples are intended in an illustrative rather than in a limiting sense. Computer-assisted processing is implicated in the described implementations. Accordingly, the present technology may be embodied in methods for establishing personalized limits on a search, systems including logic and resources to establish personalized limits on a search, systems that take advantage of computer-assisted methods for establishing personalized limits on a search, media impressed with logic to establish personalized limits on a search, data streams impressed with logic to establish personalized limits on a search, or computer-accessible services that carry out computer-assisted methods for establishing personalized limits on a search. It is contemplated that modifications and combinations will readily occur to those skilled in the art, which modifications and combinations will be within the spirit of the technology and the scope of the following claims.

We claim as follows:

1. A method of establishing personalized limits on a search responsive to a key word query to an enterprise search system, including:

receiving an object types access history for at least one particular user;

wherein the object types access history includes records of object types selected by the particular user from search results returning multiple object types and records of object types selected by the particular user via interfaces other than search results; and determining and storing in computer readable memory a personalized scope of object types by analyzing frequencies of individual object type selections in the object types access history;

wherein the personalized scope limits individual object types initially returned by an enterprise search system to object types that have frequencies above a pre-determined threshold in response to key word queries by the particular user that do not specify object types to search.

2. The method of claim 1, further including:

determining and storing in computer readable memory a personalized ordering of object types for the particular user using the object types access history;

wherein the personalized ordering of object types sets an order in which to present search results from the search performed by the enterprise search system.

3. The method of claim 1, further including creating the object types access history, including:

logging to computer readable memory at least a summary of user clicks by the particular user that select among the object types returned in the search results;

logging to computer readable memory at least a summary of user clicks by the particular user that select among the object types available via interfaces other than search results; and calculating counts of the user clicks among search results and of the user clicks via interfaces other than search results.

4. The method of claim 3, further including periodically updating the object types access history with the counts.

5. The method of claim 4, wherein the periodically updating is performed on at least a weekly basis.

6. The method of claim 3, wherein the determining further includes:

applying a first weighting function to user clicks that select among the object types returned in the search results, wherein the first weighting function weights newer user clicks more heavily than older clicks; and applying a second weighting function to user clicks that select among the object types available via interfaces other than search results, wherein the second weighting function weights newer user clicks more heavily than older clicks.

7. The method of claim 3, wherein the determining further includes:

applying at least a first threshold on number of user clicks on an object type to limit the personalized scope of object types.

8. A computer system for establishing personalized limits on a search responsive to a key word query to an enterprise search system, the computer system including one or more processors configured to perform operations including:

receiving an object types access history for at least one=particular user;

wherein the object types access history includes records of object types selected by the particular user from search results returning multiple object types and records of object types selected by the particular user via interfaces other than search results; and determining and storing in computer readable memory a personalized scope of object types by analyzing frequencies of individual object type selections in the object types access history;

wherein the personalized scope limits individual object types initially returned by an enterprise search system to object types that have frequencies above a pre-determined threshold in response to key word queries by the particular user that do not specify object types to search.

9. The computer system of claim 8, wherein the processors configured to further perform operations including creating the object types access history, including:

logging to computer readable memory at least a summary of user clicks by the particular user that select among the object types returned in the search results;

logging to computer readable memory at least a summary of user clicks by the particular user that select among the object types available via interfaces other than search results; and calculating counts of the user clicks among search results and of the user clicks via interfaces other than search results.

10. The computer system of claim 9, wherein the processors configured to further perform operations including periodically updating the object types access history with the counts.

11. The computer system of claim 10, wherein the periodically updating is performed on at least a weekly basis.

12. The computer system of claim 9, wherein the determining further includes:

applying a first weighting function to user clicks that select among the object types returned in the search results, wherein the first weighting function weights newer user clicks more heavily than older clicks; and applying a second weighting function to user clicks that select among the object types available via interfaces other than search results, wherein the second weighting function weights newer user clicks more heavily than to older clicks.

13. The computer system of claim 9, wherein the determining further includes:

applying at least a first threshold on number of user clicks on an object type to limit the personalized scope of object types.

14. The computer system of claim 8, wherein the processors configured to further perform operations including:

determining and storing in computer readable memory a personalized ordering of object types for the at least one particular user using the object types access history;

wherein the personalized ordering of object types sets an order in which to present search results from the search performed by the enterprise search system.

15. A non-transitory computer readable medium storing computer instructions to establish personalized limits on a search responsive to a key word query to an enterprise search system, comprising actions of:

receiving an object types access history for at least one particular user;

wherein the object types access history includes records of object types selected by the particular user from search results returning multiple object types and records of object types selected by the particular user via interfaces other than search results; and determining and storing in computer readable memory a personalized scope of object types by analyzing frequencies of individual object type selections in the object types access history;

wherein the personalized scope limits individual object types initially returned by an enterprise search system to object types that have frequencies above a pre-determined threshold in response to key word queries by the particular user that do not specify object types to search.

16. The non-transitory computer readable medium of claim 15, wherein the computer instructions further comprise actions of:

determining and storing in computer readable memory a personalized ordering of object types for the particular user using the object types access history;

wherein the personalized ordering of object types sets an order in which to present search results from the search performed by the enterprise search system.

17. The non-transitory computer readable medium of claim 15, wherein the computer instructions further comprise actions of creating the object types access history, including:

logging to computer readable memory at least a summary of user clicks by the particular user that select among the object types returned in the search results;

logging to computer readable memory at least a summary of user clicks by the particular user that select among the object types available via interfaces other than search results; and calculating counts of the user clicks among search results and of the user clicks via interfaces other than search results.

18. The non-transitory computer readable system of claim 17, wherein the computer instructions further comprise actions of periodically updating the object types access history with the counts.

19. The non-transitory computer readable medium of claim 18, wherein the periodically updating is performed on at least a weekly basis.

20. The non-transitory computer readable medium of claim 17, wherein the determining further includes:

applying a first weighting function to user clicks that select among the object types returned in the search results, wherein the first weighting function weights newer user clicks more heavily than older clicks; and applying a second weighting function to user clicks that select among the object types available via interfaces other than search results, wherein the second weighting function weights newer user clicks more heavily than to older clicks.

21. The non-transitory computer readable medium of claim 17, wherein the determining further includes:

applying at least a first threshold on number of user clicks on an object type to limit the personalized scope of object types.

* * * * *